(12) United States Patent
Rajeshvincent et al.

(10) Patent No.: US 8,682,761 B2
(45) Date of Patent: Mar. 25, 2014

(54) GENERATING FINANCIAL REPORTS (75) Inventors: James Rajeshvincent, North Brunswick, NJ (US); Brian Dietrich, Yardley, PA (US); Vijayabhasker M. Krishnamurthy, Lawrenceville, NJ (US); Mahalingam Joghee, Edison, NJ (US); Eric F. Wischhusen, Fairless Hills, PA (US); Michael Downey, Hillsborough, NJ (US); John Scully, Hamilton Square, NJ (US)

(73) Assignee: Bank of America Corporation, Charlotte, NC (US)

( * ) Notice: Subject to any disclaimer, the term of this patent is extended or adjusted under 35 U.S.C. 154(b) by 357 days.

(21) Appl. No.: 12/751,221

(22) Filed: Mar. 31, 2010

(65) Prior Publication Data
US 2011/0246344 A1 Oct. 6, 2011

(51) Int. Cl.
- G06Q 40/00 (2012.01)
- G06F 12/00 (2006.01)
- G06F 17/00 (2006.01)

(52) U.S. Cl.
CPC ............... *G06F 12/00* (2013.01); *G06F 17/00* (2013.01); *G06Q 40/00* (2013.01)
USPC ............................. 705/35; 707/102; 711/151

(58) Field of Classification Search
CPC .......... G06F 12/00; G06F 17/00; G06F 40/00
USPC ............................. 707/102; 711/151; 705/35
See application file for complete search history.

(56) References Cited

U.S. PATENT DOCUMENTS

| 7,165,044 | B1 | 1/2007 | Chaffee |
| 2002/0184133 | A1 | 12/2002 | Zangari et al. |
| 2008/0263106 | A1* | 10/2008 | Asherman et al. ............ 707/202 |

OTHER PUBLICATIONS

Patent Pending U.S. Appl. No. 12/750,941, entitled "Generating Financial Report Information," 37 pages, including drawings, filed Mar. 31, 2010.
USPTO Office Action for U.S. Appl. No. 12/750,941, entitled "Generating Financial Report Information," (14 pages), Feb. 3, 2012.

* cited by examiner

*Primary Examiner* — Daniel Felten
(74) *Attorney, Agent, or Firm* — Baker Botts L.L.P.

(57) ABSTRACT

In some embodiments, a method for generating financial reports, includes selecting a first request from a plurality of pending requests. The first request requests a report on information regarding one or more accounts with a financial institution. The first request is separated into a plurality of content requests. The plurality of content requests represent requests for information to be incorporated into the requested report. A plurality of subreports are received in response to each of the plurality of content requests. The requested report is generated in response to the first request by binding each of the plurality of subreports.

6 Claims, 5 Drawing Sheets

GENERATING FINANCIAL REPORTS

TECHNICAL FIELD

The present disclosure relates generally to reports and more specifically to generating financial reports.

BACKGROUND

Reports present content to a specified audience. For example, financial reports may be used to display information regarding a customer's activities with a financial institution. A financial institution may include any individual, business, or organization that engages in banking activities, such as maintaining accounts (e.g., transaction accounts, savings accounts, credit accounts, investment accounts, insurance accounts, portfolios, etc.), receiving deposits, crediting accounts, debiting accounts, extending credit to account holders, purchasing securities, providing insurance, and supervising a customer's portfolio.

SUMMARY

In some embodiments, a method for generating financial reports, includes selecting a first request from a plurality of pending requests. The first request requests a report on information regarding one or more accounts with a financial institution. The first request is separated into a plurality of content requests. The plurality of content requests represent requests for information to be incorporated into the requested report. A plurality of subreports are received in response to each of the plurality of content requests. The requested report is generated in response to the first request by binding each of the plurality of subreports.

Certain embodiments of the invention may provide one or more technical advantages. A technical advantage of one embodiment may include the capability to generate reports regarding one or more customer accounts with a financial institution. A technical advantage of one embodiment may also include the capability to schedule reports, share reports with customers through online channels, and create reports real-time during face-to-face meetings. A technical advantage of one embodiment may also include the capability to generate reports across multiple business lines and provide information on items such as balances, holdings, portfolio analysis, and performance details.

Various embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure and its advantages, reference is now made to the following description taken in conjunction with the accompanying drawings, in which.

DETAILED DESCRIPTION

It should be understood at the outset that, although example implementations of embodiments of the invention are illustrated below, the present invention may be implemented using any number of techniques, whether currently known or not. The present invention should in no way be limited to the example implementations, drawings, and techniques illustrated below. Additionally, the drawings are not necessarily drawn to scale.

A financial institution may include any individual, business, or organization that engages in banking activities, such as maintaining accounts (e.g., transaction accounts, savings accounts, credit accounts, investment accounts, insurance accounts, portfolios, etc.), receiving deposits, crediting accounts, debiting accounts, extending credit to account holders, purchasing securities, providing insurance, and supervising a customer's portfolio. Financial institutions may engage in such diverse banking activities through one or multiple lines of business. Teachings of certain embodiments recognize the capability to gather information regarding a customer's business with a financial institution and provide a report based on this information.

Figures 1, 2:
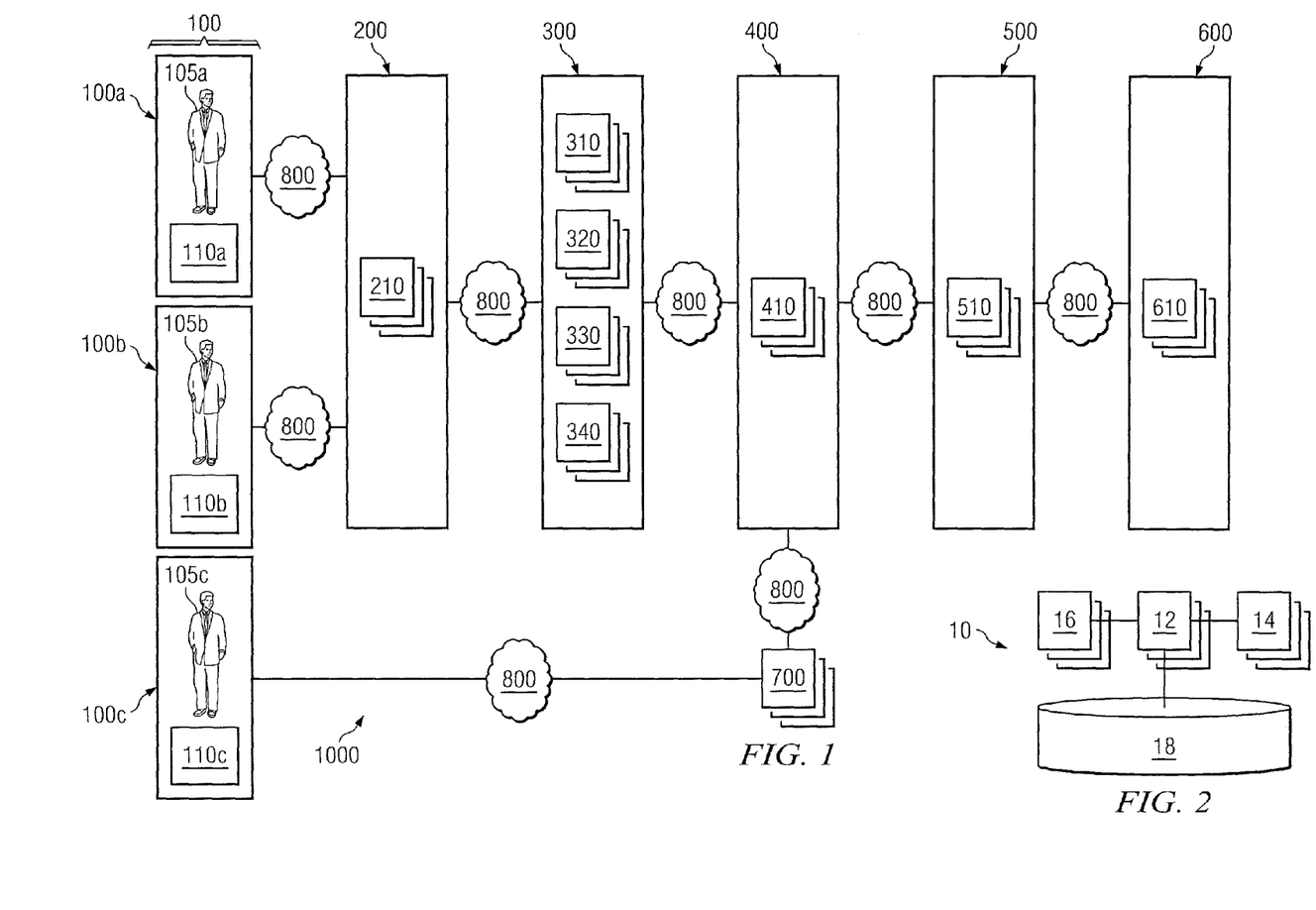
FIG. 1 shows a report generation system according to one embodiment.
FIG. 2 shows one embodiment of a computer system.

FIG. 1 shows a report generation system 1000 according to one embodiment. In operation, system 1000 generates reports for clients 100a, 100b, and 100c (collectively, clients 100). In this example, system 1000 features an application server 200, a report server 300, an orchestrator server 400, a report services server 500, a data source 600, and retrieval systems 700, communicating across one or more networks 800.

In the illustrated embodiment, clients 100 comprise a user 105a and a client system 110a; a user 105b and a client system 110b; and a user 105c and a client system 110c, respectively (collectively, users 105 and client systems 110). One example of client system 110 includes computer 10 of FIG. 2. Users 105 may include any individual, group of individuals, entity, machine, and/or mechanism that interacts with client systems 110. Examples of users 105 include, but are not limited to, a customer, customer service representative, manager, executive, accountant, engineer, technician, contractor, agent, and/or employee.

In one example embodiment, users 105a and 105b represent customer service representatives. In this example, users 105a and 105b use client systems 110a and 110b, respectively, to retrieve reports for a customer. In another example embodiment, user 105c represents a customer. In this example, user 105c uses client system 110c to retrieve reports.

In some embodiments, clients 100a and 100b are associated with different lines of business. In some examples, client systems 110a and 110b run incompatible forms of business software. For example, client systems 110a and 110b may run different proprietary and/or legacy software. Teachings of certain embodiments recognize the capability to deliver reports to clients across different lines of business running different forms of software.

In the illustrated embodiment, application server 200 includes one or more interface generators 210 is operable to provide a web page or remote application to client systems 110a and 110b. One example of application server 200 includes computer system 10 of FIG. 2. In one example embodiment, application server 200 includes one or more web servers and/or application servers.

Interface generators 210 may provide a user interface to clients 100a and 100b. In some embodiments, interface generators 210 consult configuration files 310 for information on how to render a user interface to clients 100a and 100b. In one example, interface generators 210 provide a user interface operable to receive report requests from and deliver finished reports to clients 100a and 100b. In another example, interface generators 210 list available reports, such as all available reports for a particular customer, and allow clients 100 to access the available reports. Additional embodiments of interface generators 210 are described with regard to FIG. 5.

In the illustrated embodiment, report server 300 includes one or more report configuration files 310, report requests 320, subreports 330, and completed reports 340. One example of report server 300 includes computer system 10 of FIG. 2. In this example, report server 300 stores configuration files 310, report requests 320, subreports 330, and completed reports 340 on a memory, such as memory 18.

Configuration files 310 store information describing how to render a user interface to clients 100 and/or generate completed reports 340. For example, in one embodiment, configuration files 310 specify that a user interface is to be provided on a webpage, what is to be displayed on that web page, where a user interface is to be provided on the webpage, and client-side validation information for the user interface component. In another example, configuration files 310 specify an underlying business process component for a corresponding user interface component and the input expected for this business process component. In yet another example, configuration files 310 specify how the user interface receives raw input from clients 100 and processes the raw input to get the desired output. In some embodiments, this information includes how to receive a report request, how to process a report request, how to reply to a report request, and/or how to provide a requested report in response to the report request.

Report requests 320 represent requests for reports received. However, teachings of certain embodiments recognize that report server 300 may receive report requests 320 from any suitable source, such as from clients 100 through application server 200. Additionally, report requests 320 posted to report server 300 may not necessarily be in the same format as the report request generated by clients 100. In some embodiments, system 1000 automatically generates and schedules report requests 320 rather than receive requests from clients 100.

Figure 3A:
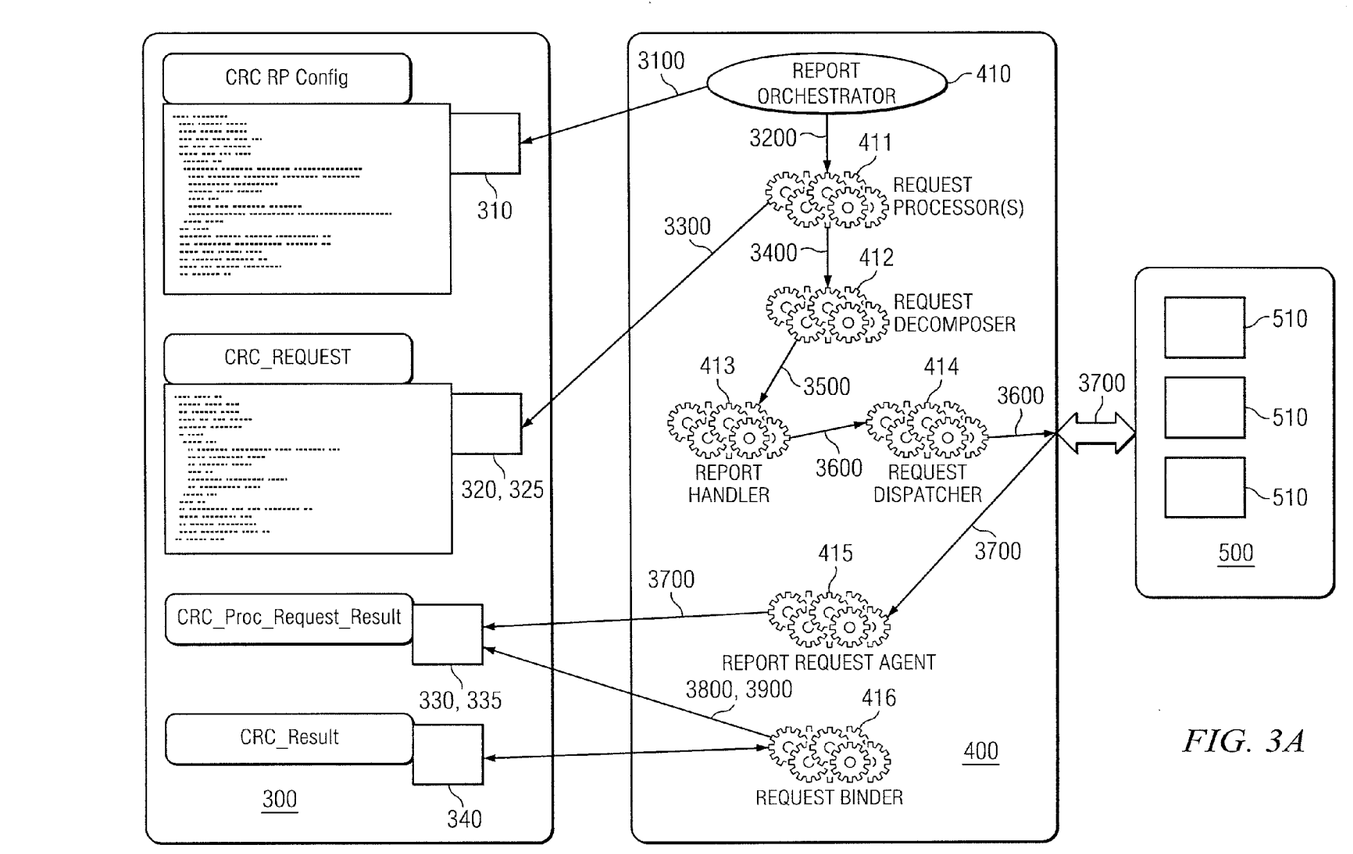
FIGS. 3A and 3B show a method for generating a report according to one embodiment.
Figure 3B:
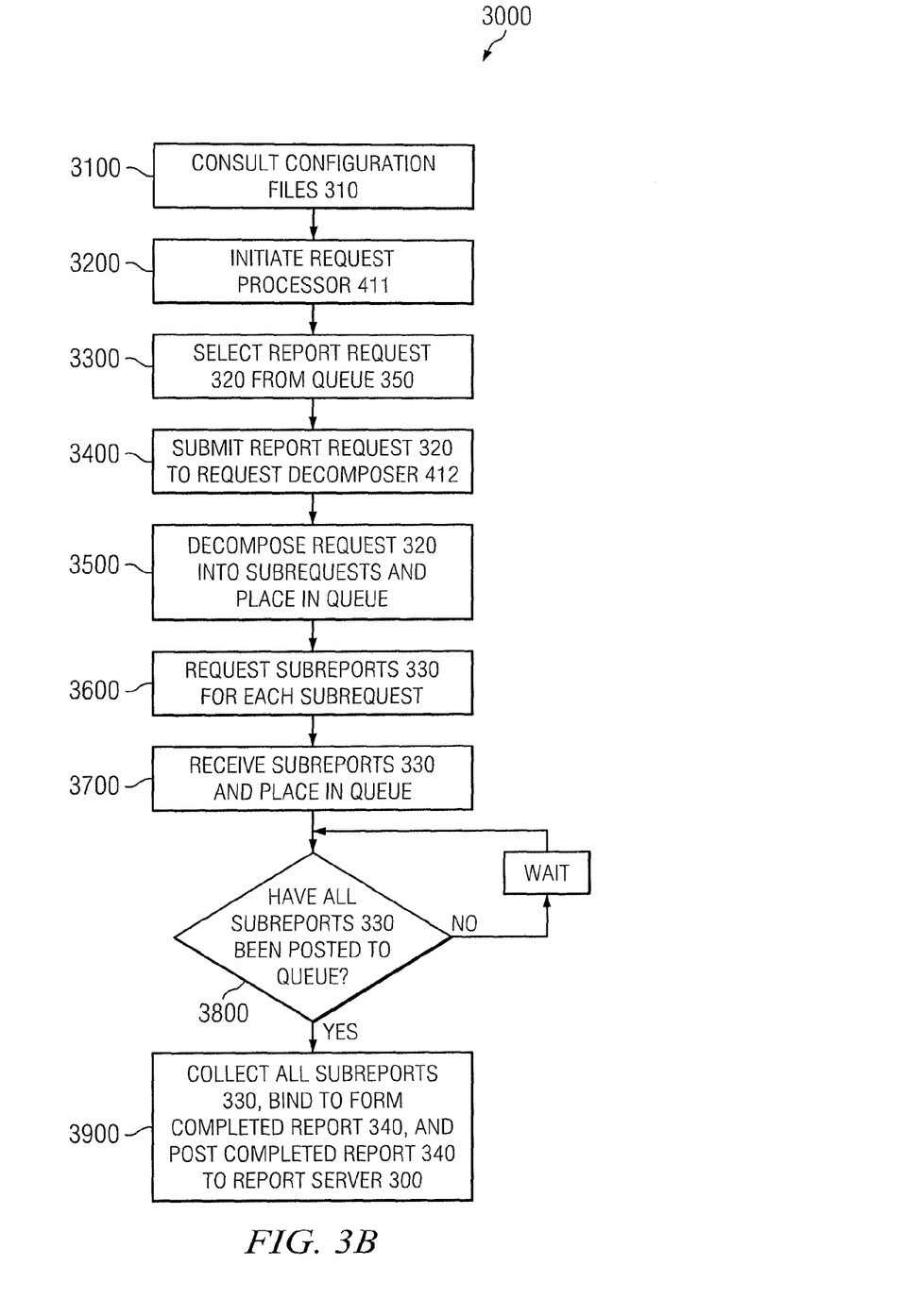

Subreports 330 represent partial reports generated by orchestrator server 400. Completed reports 340 represent a report ready for delivery to clients 100 in response to report request 320. Subreports 330 and completed reports 340 may be generated in any suitable format. Examples include Portable Document Format (PDF), Tagged Image File Format (TIFF), and eXtensible Markup Language (XML) format. Additional examples and embodiments of configuration files 310, report requests 320, subreports 330, and completed reports 340 are described with regard to FIGS. 3 and 4.

In the illustrated embodiment, orchestrator server 400 includes one or more report orchestrators 410. One example of orchestrator server 400 includes computer system 10 of FIG. 2. Report orchestrator 410 is responsible for receiving report requests 320, consulting configuration files 310, generating subreports 330, and binding subreports 330 into completed reports 340. Additional examples and embodiments are described with regard to FIGS. 3 and 4.

In the illustrated embodiment, report services server 500 features one or more report services 510. One example of report services server 500 includes computer system 10 of FIG. 2.

Report services 510 may include any service used to retrieve, format, or generate information for inclusion into a report. One example report service 510 is a finder service used to retrieve data from data source 600 for inclusion in a report. Another example report service 510 is a eXtensible Stylesheet Language-Formatting Object (XSL-FO) machine used to generate subreports 330 using XML. Yet another example report service 510 is an international report service used to generate reports for international users or process information regarding international accounts. For example, in one embodiment, international report service supports multiple languages and currency conversions.

In some embodiments, report services 510 consult configuration files 310. For example, in one embodiment, configuration files 310 specify the relationship between requests received from clients 100 through the user interface and the available financial data 610. For example, in some embodiments interface generators 210 allow clients 100 to select one or more report templates; after selection, report orchestrators 410 and/or report services 510 consult configuration files 310 to determine which data to include for each respective report template.

In the illustrated embodiment, data source 600 provides financial data 610 for ultimate inclusion in completed reports 340. One example of data source 600 includes computer system 10 of FIG. 2. In this example, data source 600 stores financial data 610 on a memory, such as memory 18. One example of financial data 610 may include financial information provided by a financial information generation system, such as the financial information generation system 1000 of U.S. patent application Ser. No. 12/750,941, titled "Generating Financial Report Information," filed Mar. 31, 2010, which is hereby incorporated by reference in its entirety.

Financial data 610 may include any suitable information and may be stored in any suitable organization or format. In one exemplary embodiment, financial data 610 represents data regarding a customer's accounts with a financial institution. Examples of financial data 610 include current data, historical data, and effective-dated data. In some embodiments, financial data 610 includes data other than a customer's data, such as market data, fund data, and any other suitable data.

In some embodiments, this financial data 610 is included in a database. For example, financial data 610 may include a table of all transactions for a customer's deposit account. In another example, financial data 610 includes tables chronicling transactions and changes in value in various securities in a customer's investment portfolio. However teachings of certain embodiments recognize that financial data 610 is not limited to database data, but rather financial data 610 may be represented in any suitable form or format. For example, in some embodiments, data store 600 produces financial data 610 as subreports 330. In this example, report orchestrator 410 identifies the appropriate subreport 330 stored with financial data 610 and either retrieves data from subreport 330 to generate a new subreport 330 or copies subreport 330 from data source 600 to report server 300.

In the illustrated embodiment, retrieval systems 700 represent systems for retrieving and communicating reports to client 100c. One example of retrieval systems 700 includes computer system 10 of FIG. 2.

In one example embodiment, retrieval system 700 includes a print system. Teachings of certain embodiments recognize that incorporating a print system into system 1000 may allow system 1000 to efficiently generate and print periodic reports, such as daily, monthly, quarterly, or yearly reports, for inclusion in a customer statement or for any other suitable purpose.

In another example embodiment, retrieval system 700 includes an email server and/or a webpage server. In this example, client 100c requests a report, such as through a web portal, and retrieval system 700 delivers the requested report to client 100c. In another example, clients 100a or 100b request a report be delivered to client 100c and select a mode of delivery, and system 1000 chooses an appropriate retrieval system 700 for the selected mode of delivery.

In the illustrated embodiment, network 800 may represent any number and combination of wireline and/or wireless networks suitable for data transmission. Network 800 may, for example, communicate Internet protocol packets, frame relay frames, asynchronous transfer mode cells, and/or other suitable information between network addresses. Network 800 may include a public or private data network; one or more intranets; a local area network (LAN); a metropolitan area network (MAN); a wide area network (WAN); a wireline or wireless network; a local, regional, or global communication network; an optical network; a satellite network; a cellular network; an enterprise intranet; all or a portion of the Internet; other suitable communication links; or any combination of the preceding.

System 1000 may include one or more networks 800. For example, FIG. 1 shows multiple networks 800. However, teachings of certain embodiments recognize that more or fewer networks 800 may be used. Further, teachings of certain embodiments also recognize that communications over network 800 is one example of a mechanism for communicating between parties, and any suitable mechanism may be used.

In operation, according to one embodiment, system 1000 generates requested reports and delivers the reports to designated recipients. For example, in one embodiment, client 100a requests an immediate PDF report on a customer's investment portfolio. In this example, client 100a submits the request through a user interface provided by interface generators 210. In response, application server 200 generates report request 320 and provides scheduling, formatting, and any other suitable information in configuration file 310. Report orchestrator 410 receives report requests 320 and consults configuration files 310. Report orchestrator 410 generates subreports 330 by requesting financial data 610 through report services 510. Report orchestrator 410 then binds subreports 330 into completed report 340 and posts completed report 340 to report server 300. Application server 200 retrieves completed report 340 and communicates completed report 340 to client 100a.

FIG. 2 shows one embodiment of a computer system 10. Computer system 10 may include processors 12, input/output devices 14, communications links 16, and memory 18. In other embodiments, computer system 10 may include more, less, or other components.

Computer system 10 may be operable to perform one or more operations of various embodiments. Although the embodiment shown provides one example of computer system 10 that may be used with other embodiments, such other embodiments may additionally utilize computers other than computer system 10. Additionally, embodiments may also employ multiple computer systems 10 or other computers networked together in one or more public and/or private computer networks, such as one or more networks 800.

Processors 12 represent devices operable to execute logic contained within a medium. Examples of processor 12 include one or more microprocessors, one or more applications, and/or other logic. Computer system 10 may include one or multiple processors 12.

Input/output devices 14 may include any device or interface operable to enable communication between computer system 10 and external components, including communication with a user or another system. Example input/output devices 14 may include, but are not limited to, a mouse, keyboard, display, and printer.

Network interfaces 16 are operable to facilitate communication between computer system 10 and another element of a network, such as other computer systems 10. Network interfaces 16 may connect to any number and combination of wireline and/or wireless networks suitable for data transmission, including transmission of communications. Network interfaces 16 may, for example, communicate audio and/or video signals, messages, internet protocol packets, frame relay frames, asynchronous transfer mode cells, and/or other suitable information between network addresses. Network interfaces 16 connect to a computer network or a variety of other communicative platforms including, but not limited to, a public switched telephone network (PSTN); a public or private data network; one or more intranets; a local area network (LAN); a metropolitan area network (MAN); a wide area network (WAN); a wireline or wireless network; a local, regional, or global communication network; an optical network; a satellite network; a cellular network; an enterprise intranet; all or a portion of the Internet; other suitable network interfaces; or any combination of the preceding.

Memory 18 represents any suitable storage mechanism and may store any information for use by computer system 10. Memory 18 may comprise one or more tangible, computer-readable, and/or computer-executable storage medium. Examples of memory 18 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

In some embodiments, memory 18 stores logic 20. Logic 20 facilitates operation of computer system 10. Logic 20 may include hardware, software, and/or other logic. Logic 20 may be encoded in one or more tangible, non-transitory media and may perform operations when executed by a computer. Logic 20 may include a computer program, software, computer executable instructions, and/or instructions capable of being executed by computer system 10. Example logic 20 may include any of the well-known OS2, UNIX, Mac-OS, Linux, and Windows Operating Systems or other operating systems. In particular embodiments, the operations of the embodiments may be performed by one or more computer readable media storing, embodied with, and/or encoded with a computer program and/or having a stored and/or an encoded computer program. Logic 20 may also be embedded within any other suitable medium without departing from the scope of the invention.

FIGS. 3A and 3B show a method 3000 for generating a report according to one embodiment. In FIG. 3A, report orchestrator 410 initiates a number of threads, identified as request processor 411, request decomposer 412, report handler 413, request dispatcher 414, report request agent 415, and request binder 416 (collectively, threads 411-416). Teachings of certain embodiments recognize that report orchestrator 410 may asynchronously initiate multiple instances of each of threads 411-416.

At step 3100, report orchestrator 410 consults configuration files 310. In some embodiments, configuration files 310 identify parameters for request processor 411 and provide the start, stop, and sleep duration for each of threads 411-416. At step 3200, request orchestrator 410 initiates request processor 411.

At step 3300, request processor 411 selects report request 320 from queue 325. In some embodiments, queue 325 arranges pending report requests 320 according to queue rules. These queue rules may prioritize report requests 320 according to parameters such as a category of requesting user (e.g., customer, employee, or automated report), time and date of request, current time and date (e.g., ordinary business hours), expected time needed to process a report request, and a type of requested report. Examples of a type of requested report include, but are not limited to, a periodic statement report, a report in response to an internet request, international reports, and a report limited to specific accounts or categories of information. Additional embodiments of queue 325 are described with regard to FIG. 4.

At step 3400, request processor 411 submits report request 320 to request decomposer 412. At step 3500, request decomposer 412 decomposes request 320 into subrequests, and report handler 413 places the subrequests into queue 335. In some embodiments, request decomposer 412 applies decomposing rules provided by configuration files 310 to decompose request 320 into individual content requests. In one embodiment, request decomposer 412 calls a transaction to resolve and identify customer accounts in each subrequest.

At step 3600, request dispatcher 414 requests subreports 330 from report services 510 for each of the subrequests. Teachings of certain embodiments recognize that step 3600 may be performed asynchronously. For example, in one embodiment, multiple subreports 330 identify subrequests and request subreports 330 without waiting for other subreports 330 to be obtained.

Once report services 510 return with one of the requested subreports 330, report services 510 submit the subreport 330 to report request agent 415 at step 3700, which then stores the subreport 330 in queue 335 on report server 300.

At step 3800, request binder 416 monitors the subreport queue 335 for completed subreports 330. Once request binder 416 determines that the subreport queue 335 has subreports 330 for each of the subrequests from step 3500, request binder 416 binds the subreports 330 to form completed report 340 and then posts the completed report to report server 300 at step 3900. Report binder 416 may bind subreports 330 according to any suitable mechanism. For example, in one embodiment, subreports 330 are in a PDF or TIFF format, and report binder 416 attaches pages from subreports 330 to form a single document completed report 340. In another example, request binder 416 extracts information from subreports 330 to form a new completed report 340.

Figure 4:
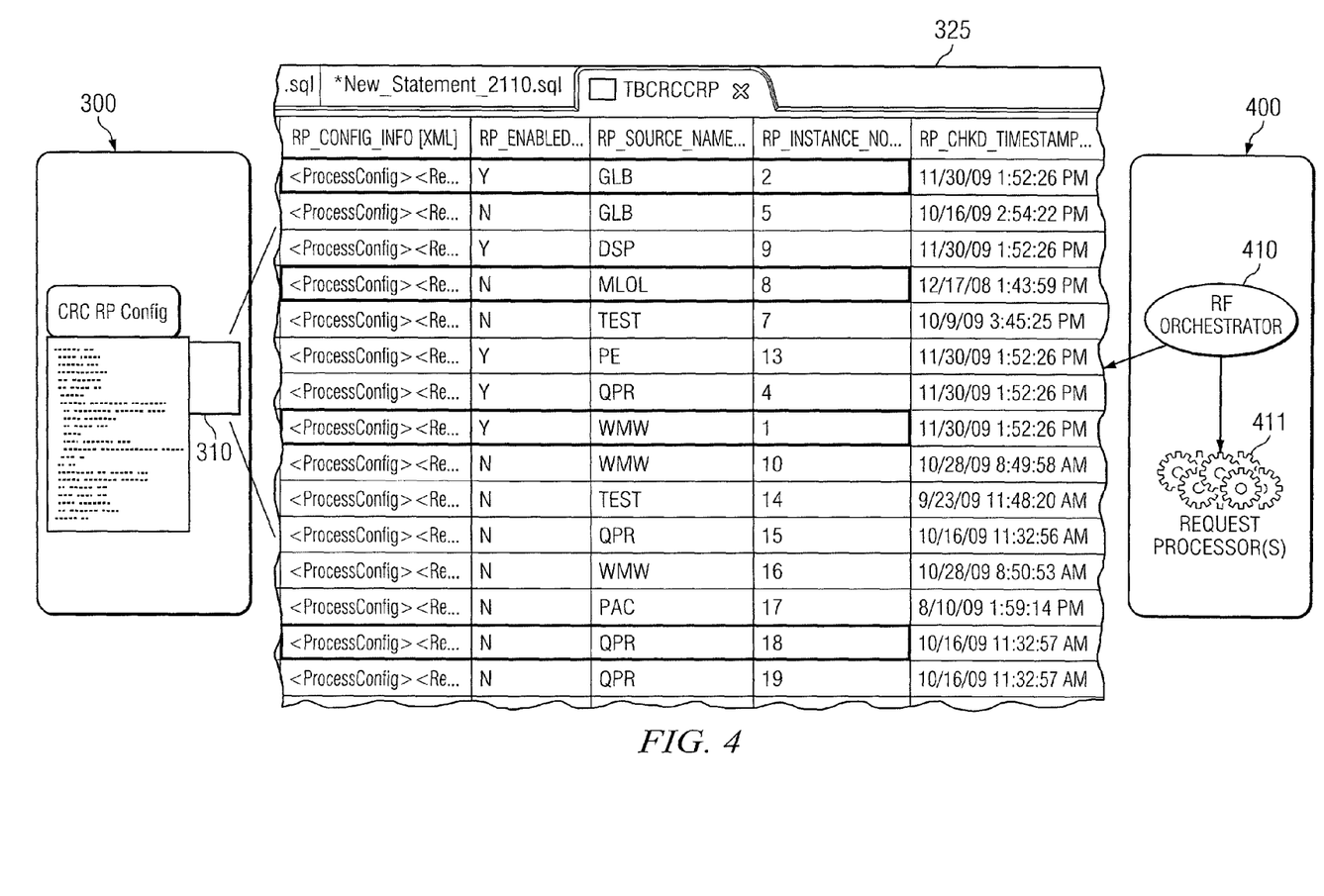
FIG. 4 shows a queue according to one embodiment.

FIG. 4 shows queue 325 according to one embodiment. In the illustrated embodiment, queue 325 is a table of report requests 320, with each row representing one report request 320. In this example, configuration files 310 provide the queue rules that define the order of queue 325. In some embodiments, query 325 assigns each report request 320 to a request processor 411. Queue 325 may also specify the start, stop, and sleep duration for each request processor 411, which may enable orchestrator sever 400 to provide dedicated request processors 411 as per demand. For example, in one embodiment, customer requests have higher priority during business hours, and queue 325 will thus call more request processors 411 active to handle requests from customers. At night, statement report requests may have higher priority, and queue 325 may call different request processors 411 active to handle statement reports.

Figure 5:
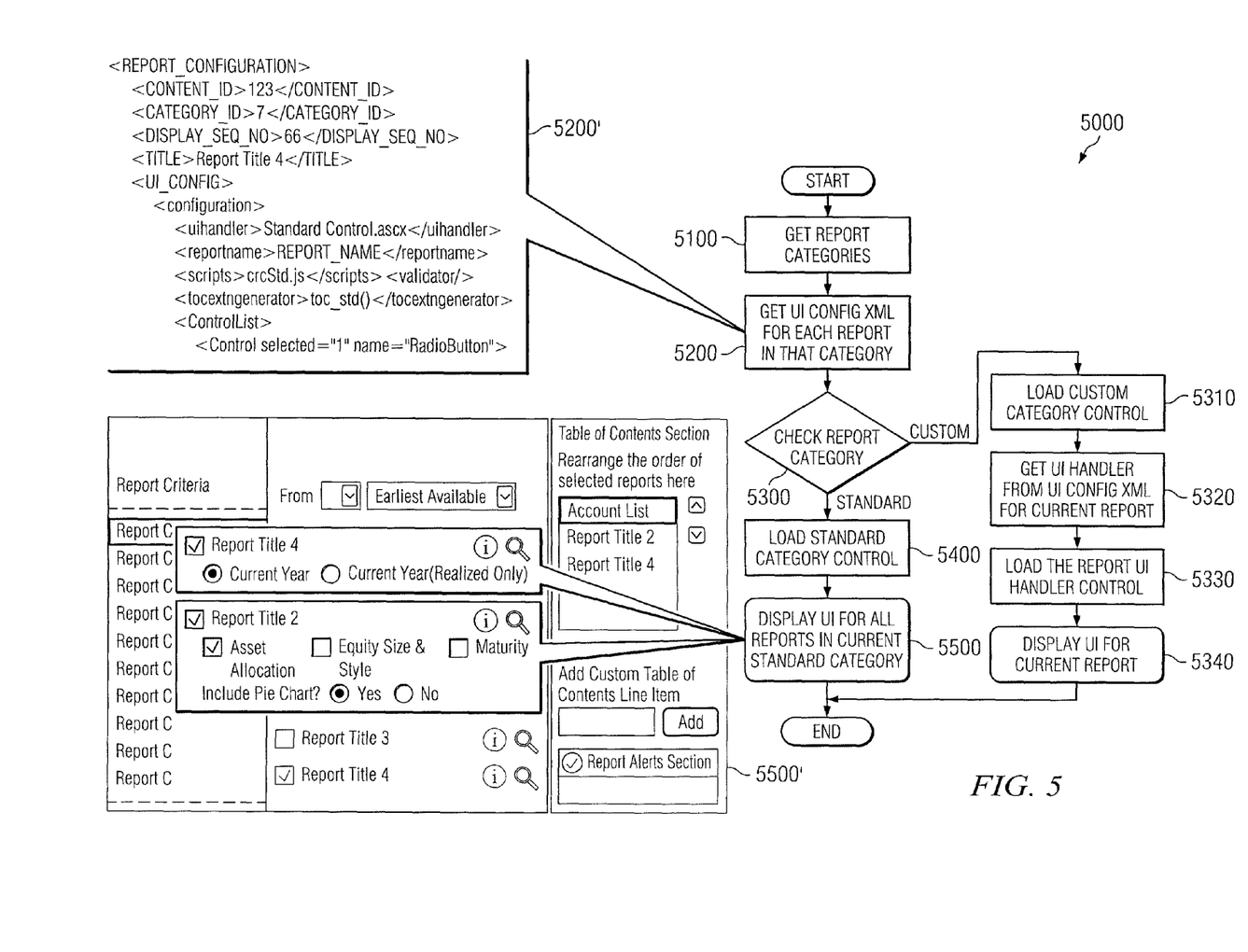
FIG. 5 shows a method of rendering a user interface according to one example embodiment.

FIG. 5 shows a method 5000 of rendering a user interface according to one example embodiment. At step 5100, interface generator 210 receives report category selections from client 100a. At step 5200, interface generator 210 retrieves configuration XML from configuration file 310 for each category selection from client 100a. In one example, interface generator 210 renders the user interface to client 100a based on client 100a's line of business and based on parameters included in configuration file 310. In this example, the rendered user interface may include report category options that are based on the line of business and configuration file 310. 5200' represents an example configuration XML file 310 that interface generator 210 retrieves.

At step 5300, interface generator 210 determines whether the selected category is a standard category or a custom category. If client 100a selected a standard category, then interface generator 210 loads standard category control at step 5400 and displays a user interface for all reports in the selected standard category at step 5500. 5500' represents an example user interface presenting options for standard report categories.

If client 100a selected a custom category, then interface generator 210 loads custom category control at step 5310 and retrieves a user interface handler from configuration file 310 for each of the custom categories selected at step 5320. At step 5330, interface generator 210 loads the user interface handler for the custom categories and then displays a user interface for the selected custom categories at step 5340.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order. Additionally, operations of the systems and apparatuses may be performed using any suitable logic. As used in this document, "each" refers to each member of a set or each member of a subset of a set.

Although several embodiments have been illustrated and described in detail, it will be recognized that substitutions and alterations are possible without departing from the spirit and scope of the present invention, as defined by the appended claims.

To aid the Patent Office, and any readers of any patent issued on this application in interpreting the claims appended hereto, applicants wish to note that they do not intend any of the appended claims to invoke paragraph 6 of 35 U.S.C. §12 as it exists on the date of filing hereof unless the words "means for" or "step for" are explicitly used in the particular claim.

What is claimed is:

1. A non-transitory computer readable medium comprising logic for execution, the logic, when executed by a processor, operable to:
    select a first request from a plurality of pending requests, the first request requesting a report on information regarding one or more accounts with a financial institution;
    separate, based at least in part upon at least one decomposing rule, the first request into a plurality of content requests, the plurality of content requests representing requests for information to be incorporated into the requested report;
    receive a plurality of subreports asynchronously in response to each of the plurality of content requests; and
    generate the requested report, by binding each of the plurality of subreports to form a completed report, in response to receiving all of the plurality of subreports.

2. The medium of claim 1, the logic when executed being further operable to:
    receive report selections from a user interface, the report selections identifying one or more report categories to be provided in the requested report;

receive scheduling information from the user interface, the scheduling information identifying when the requested report should be generated; and communicate the generated requested report to the user interface for display to a user.

3. The medium of claim 1, the logic when executed being further operable to select the first request by:

arranging the plurality of pending requests in a queue according to configuration rules, the configuration rules prioritizing pending requests according to an attribute selected from the group consisting of a category of requesting user, a time and date of request, and a current time and date; and selecting the first request by selecting the highest-priority pending request in the queue.

4. The medium of claim 3, wherein the configuration rules specify decomposing rules.

5. The medium of claim 1, the logic when executed being further operable to:

request content from one or more content providers in response to each of the plurality of content requests; and generate the plurality of subreports from the content retrieved in response to each of the plurality of content requests.

6. The medium of claim 1, wherein the plurality of subreports are generated in a format selected from a group consisting of Portable Document Format (PDF), Tagged Image File Format (TIFF), and eXtensible Markup Language (XML) format.

\* \* \* \* \*